United States Patent
Wong et al.

(10) Patent No.: US 8,396,993 B2
(45) Date of Patent: Mar. 12, 2013

(54) DATA PACKER FOR PACKING AND ALIGNING WRITE DATA

(75) Inventors: Raymond Hoi Man Wong, Santa Clara, CA (US); Samuel Hammond Duncan, Arlington, MA (US); Lukito Muliadi, San Jose, CA (US); Madhukiran V. Swarna, Portland, OR (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/397,591

(22) Filed: Feb. 15, 2012

(65) Prior Publication Data
US 2012/0139928 A1    Jun. 7, 2012

Related U.S. Application Data

(62) Division of application No. 12/262,138, filed on Oct. 30, 2008, now Pat. No. 8,135,885.

(51) Int. Cl.
*G06F 3/00* (2006.01)
*G06F 13/00* (2006.01)

(52) U.S. Cl. .......... 710/5; 710/2; 710/8; 710/36; 710/52

(58) Field of Classification Search .................. None
See application file for complete search history.

(56) References Cited

U.S. PATENT DOCUMENTS

| | | | | |
|---|---|---|---|---|
| 2003/0005103 A1* | 1/2003 | Narad et al. | ................ | 709/223 |
| 2003/0037190 A1* | 2/2003 | Alexander et al. | ............ | 710/52 |
| 2005/0149725 A1* | 7/2005 | Sydir et al. | ................... | 713/160 |

* cited by examiner

*Primary Examiner* — Scott Sun
(74) *Attorney, Agent, or Firm* — Patterson & Sheridan, LLP

(57) ABSTRACT

A data packer of an input/output hub of a computer system packs and formats write data that is supplied to it before the write data is written into a memory unit of the computer system. More particularly, the data packer accumulates write data received from lower bandwidth clients for delivery to a high bandwidth memory interface. Also, the data packer aligns the write data, so that when the write data is read out from the write data packer, no further alignment is needed.

20 Claims, 6 Drawing Sheets

DATA PACKER FOR PACKING AND ALIGNING WRITE DATA

CROSS-REFERENCE TO RELATED APPLICATIONS

This application is a divisional application of U.S. patent application Ser. No. 12/262,138, filed Oct. 30, 2008, which is herein incorporated by reference in its entirety.

BACKGROUND OF THE INVENTION

1. Field of the Invention

The present invention generally relates to computer hardware. More specifically, the present invention relates to data packers for packing and aligning write data before the write data is written to memory.

2. Description of the Related Art

A modern computer system may be implemented with a processor that executes many operations in parallel known as a parallel processing unit (PPU). PPUs generally include one or more engines (or clients), that perform operations such as memory management, graphics display, instruction fetching, encryption, and other operations.

Clients often write data to and read data from parallel processor (PP) local memory and system memory. This data may include texture maps, 3-D models, or other types of data. Different clients may write data to PP memory differently depending on the configuration of each client. For example, one client may write data in 4-byte bursts, while another client may write data in 32-byte bursts. Different clients may also write data with different address alignments. For example, one client may write data that is 16-byte address aligned, while another client may write data that is 8-byte address aligned. Naïve clients may also write memory that has a data type into which the data to be written must be transformed (e.g. block linear vs pitch linear).

Inefficiencies result when a client writes data to PP memory using a conventional data packer, which may output data with a burst size that is smaller than the maximum burst size received by PP memory. In such a case, the entire memory bandwidth of PP memory may be consumed during a write cycle even though some of the bandwidth is not being used. In general, a client that uses a data packer with a burst size that is smaller than the maximum burst size received by PP memory to write data may underutilize the bandwidth of PP memory by writing data in small bursts, thus not taking full advantage of the available bandwidth. For example, if PP memory could receive a maximum burst size of 32 bytes and a data packer with a write burst size of 4 bytes was used by a client to write 64 bytes of data, 16 clock cycles would be required. As a result, a client with a low write burst size may waste clock cycles by not taking full advantage of the maximum burst size PP memory may receive.

Accordingly, there remains a need in the art for a technique to more efficiently write data to PP memory.

SUMMARY OF THE INVENTION

One or more embodiments of the invention provide a data packer for an input/output unit of a computer system, that packs and formats write data that is supplied to it. More particularly, the data packer accumulates write data received from lower bandwidth clients for delivery to a high bandwidth memory interface. Also, the data packer aligns the write data, so that when the write data is read out from the write data packer, no further alignment is needed.

A method of storing write data in a memory unit, according to an embodiment of the invention, uses a plurality of data packers, each having a width of N bytes and coupled to a client issuing write requests. This method includes the steps of receiving write data from each of the clients as a stream of data bursts having a width that is less than N bytes, storing the write data from each of the clients in a corresponding data packer, and reading out the write data from each of the data packers and storing the write data in the memory unit.

A method of storing write data in a memory unit, according to another embodiment of the invention, uses an alignment buffer. This method includes the steps of receiving a write request including an offset and write data, determining a location in the alignment buffer corresponding to the offset, storing the write data in the alignment buffer beginning at the determined location, and reading out the write data from the alignment buffer and storing the write data in the memory unit. The alignment buffer in such a method may be a write data packer.

In a computer system having an input/output unit that handles write requests from multiple clients, a plurality of alignment buffers, each corresponding to one of the clients, is used. Write data of a write request received from a first client is formatted by a first alignment buffer and write data of a write request received from a second client is formatted by a second alignment buffer. The formatting includes alignment of the write data based on an offset that is specified in the write request for the write data. The write data are supplied from the clients to the alignment and packing buffers as a series of data bursts, and in one embodiment, the alignment buffers are FIFOs having the same width that is equal to or larger than the data burst size of any of the clients.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
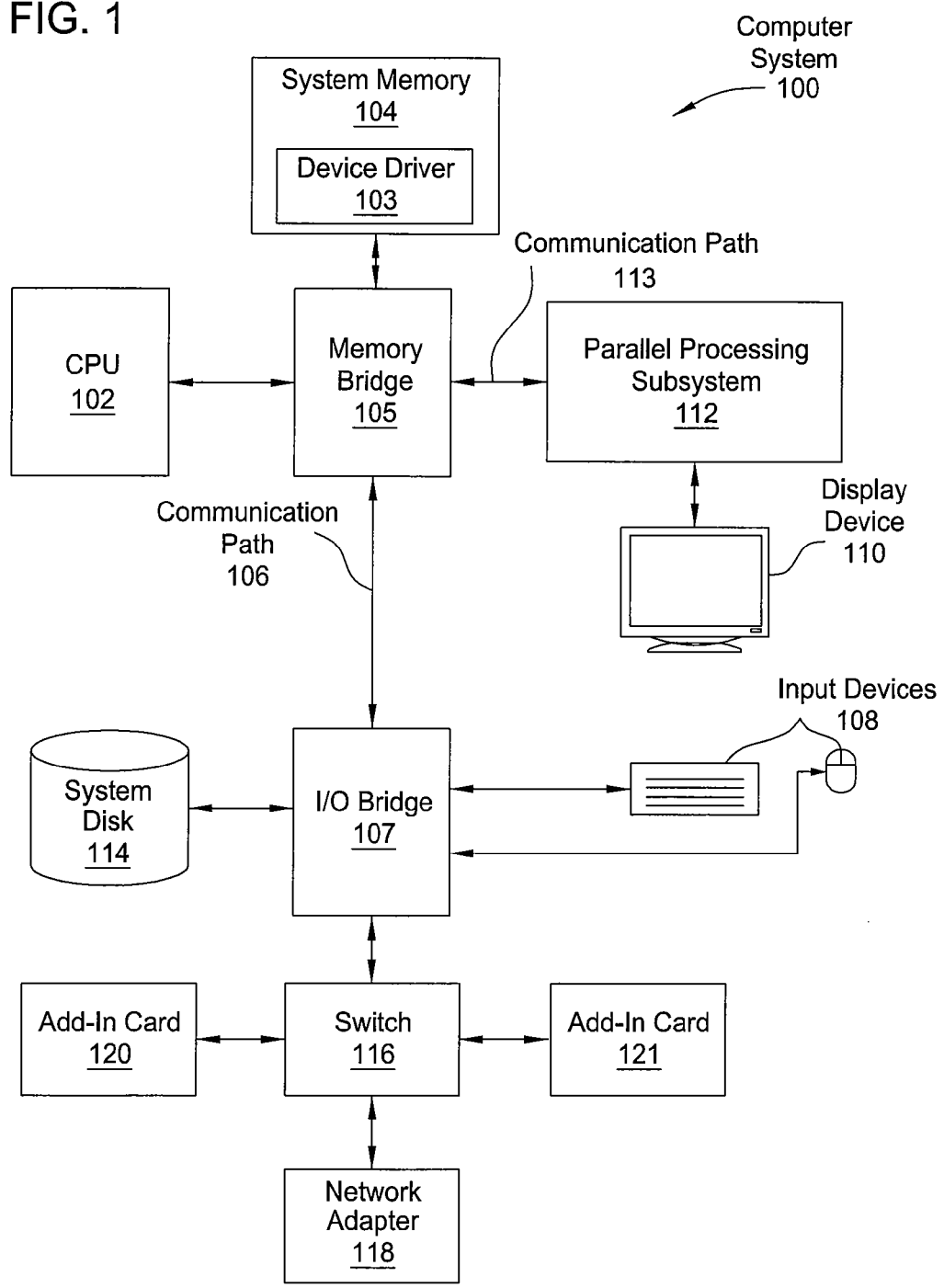
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
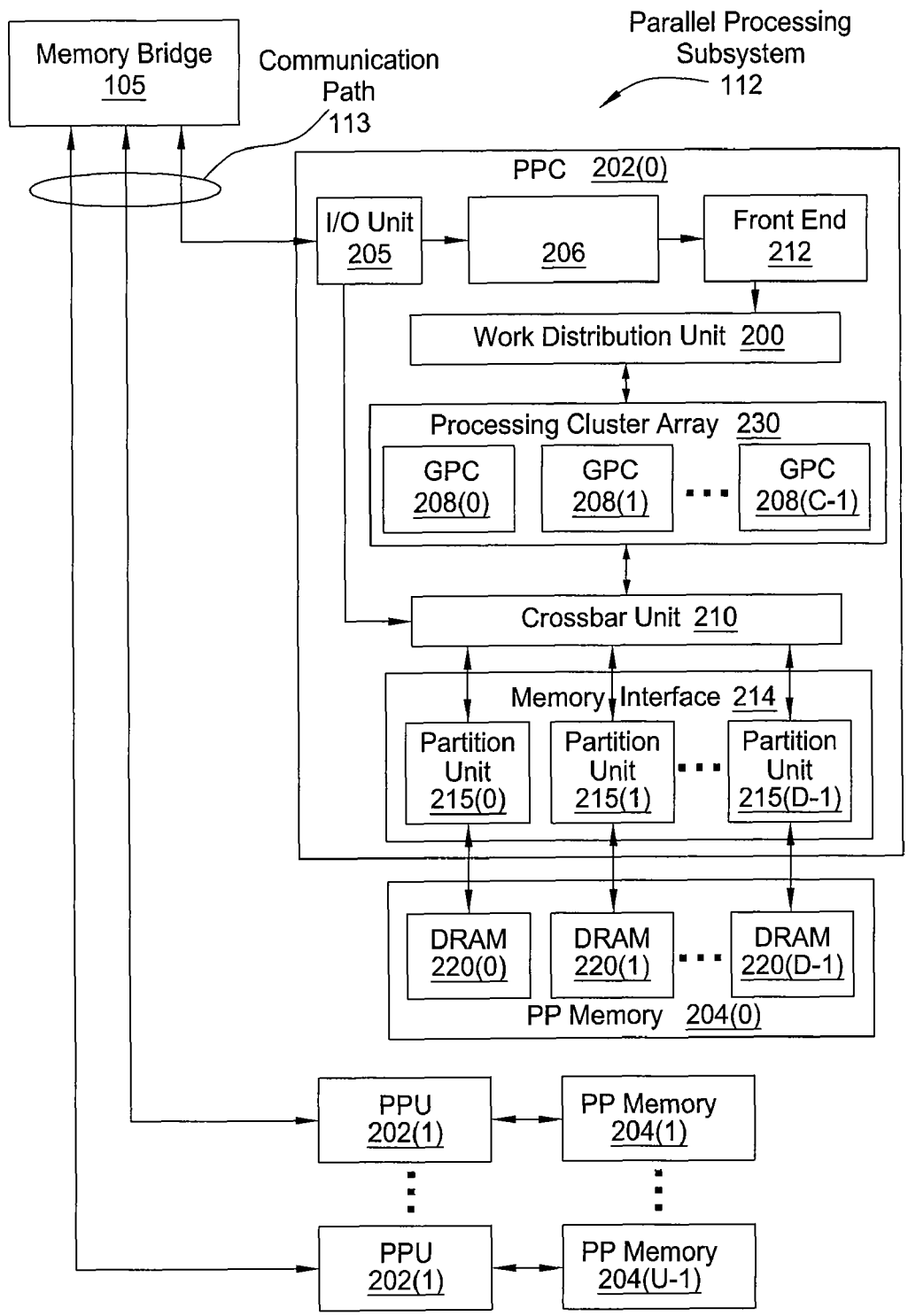
FIG. 2 is a block diagram of a parallel processing subsystem for the computer system of FIG. 1.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≧1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3:
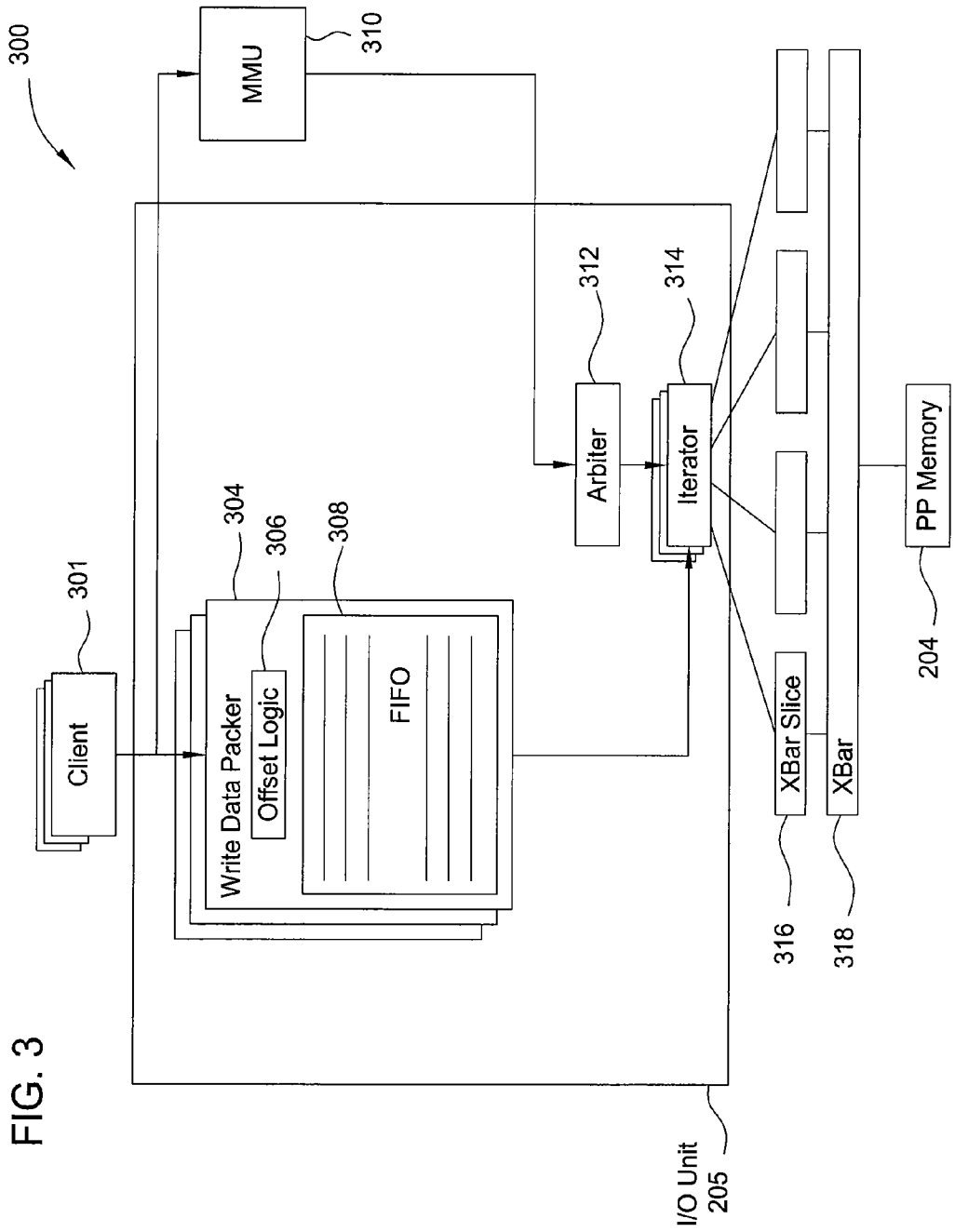
FIG. 3 is a block diagram of components of the parallel processing subsystem of FIG. 2 that handle write requests from clients.

FIG. 3 is a block diagram of components of parallel processing subsystem 112 that handle write requests from clients. As shown, the components of parallel processing subsystem 112 that handle write requests from clients include I/O unit 205 that (i) receives write requests from clients 301 and (ii) includes a write data packer 304 assigned to each client 301, an arbiter 312, and a plurality of iterators 314. Clients 301 include host interface 206, front end 212, and engines that perform operations such as memory management, graphics display, instruction fetching, encryption, and other operations. Each write request from clients 301 includes a virtual page number and an offset that identifies the memory location for the data within a page and size of the data. Other modifiers of the memory address include data type and page size. The offset, size, and write data are transmitted to write data packer 304 and the page number is transmitted to a memory management unit (MMU) 310. MMU 310 translates the virtual address into a physical address and transmits the physical address to arbiter 312.

Write data packer 304 includes offset logic 306 and a FIFO 308. Offset logic 306 extracts the offset from the write command and initiates writing to the top line of FIFO 308 at the specified offset. Successive writes may occur on one line of FIFO 308, thus packing write data into an m-byte wide segment, where m is equal to the width of the memory interface. With this configuration, the impedance of the memory unit is matched to the width of FIFO 308, allowing data to be written at the maximum bandwidth of the memory interface. When packed, aligned data is ready, write data packer 304 transmits a "ready" signal to iterator 314 which then pulls the packed, aligned data from FIFO 308 and transmits the data to PP memory 204 through crossbar (x-bar) slices 316.

Figure 4:
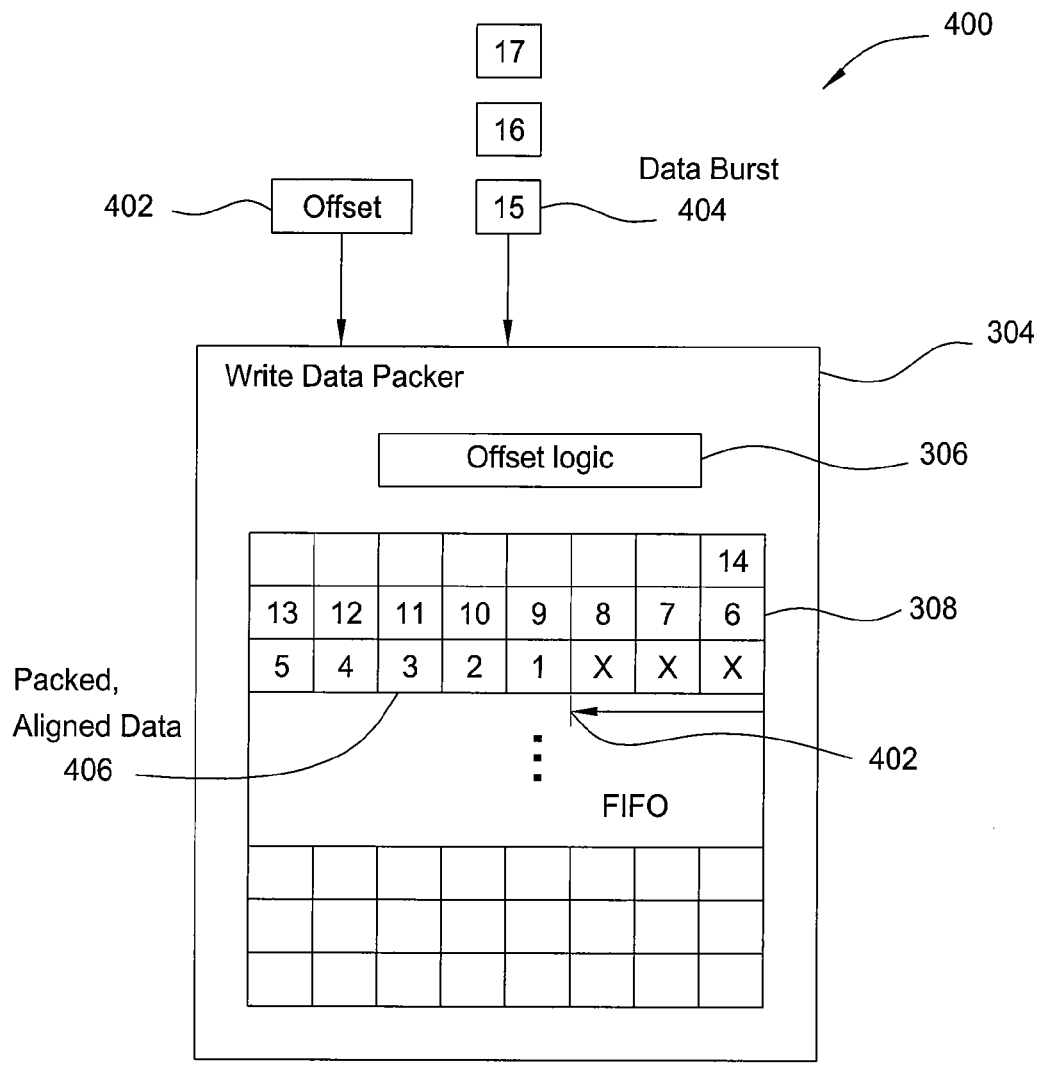
FIG. 4 is a conceptual diagram illustrating how a write data packer performs the data packing and alignment procedure.

FIG. 4 is a conceptual diagram illustrating how write data packer 304 performs data packing and alignment. As shown, write data packer 304 includes, without limitation, offset logic 306 and FIFO 308 that stores packed, aligned data 406. Write data packer 304 receives an offset 402 and a sequence of n-byte wide data bursts 404 and records each data burst 404 at the top line of FIFO 208 starting at offset 402. Because FIFO 308 is m bytes wide, where m>n, successive data bursts 404 may be written to the same line of FIFO 308 until that line becomes full. As is well known in the art, additional data may be written to the top of a FIFO once data has been pulled from the bottom and the remaining lines of the FIFO have been pushed down. Accordingly, once a given line of FIFO 308 becomes packed with data bursts 404, writing may commence on the available top line provided data has been removed from the bottom of FIFO 308 and the remaining lines of FIFO 308 have been pushed down. Data bursts 404 written to FIFO 308 in this fashion are illustrated in FIG. 4 as squares labeled 1-14 that comprise packed, aligned data 406.

Each square of packed, aligned data 406 was received as a data burst 404. The labels on each square of packed, aligned data 406 represent the order in which data bursts 404 were received. As shown, the square labeled 1 was received first and was thus written at offset 402, while subsequent data bursts 404 were written to FIFO 308 sequentially to the left. The next received data burst 404, labeled 15, will be written immediately to the left of previously received data burst 404, illustrated by the square labeled 14. When packed, aligned data 406 is pushed to the bottom of FIFO 308 that data is then ready to be pulled by iterator 314.

Arbiter 312 receives the physical address from MMU 310 and transmits this address to iterator 314 when write data packer 304 has finished packing the write data. Iterator 314 translates the physical address into a crossbar raw address that specifies a crossbar (x-bar) slice 316 through which data will be sent. Iterator 314 then pulls packed, aligned data 406 from the bottom of FIFO 308 and sends the data to x-bar slices 316 specified by the crossbar raw address.

Figure 5:
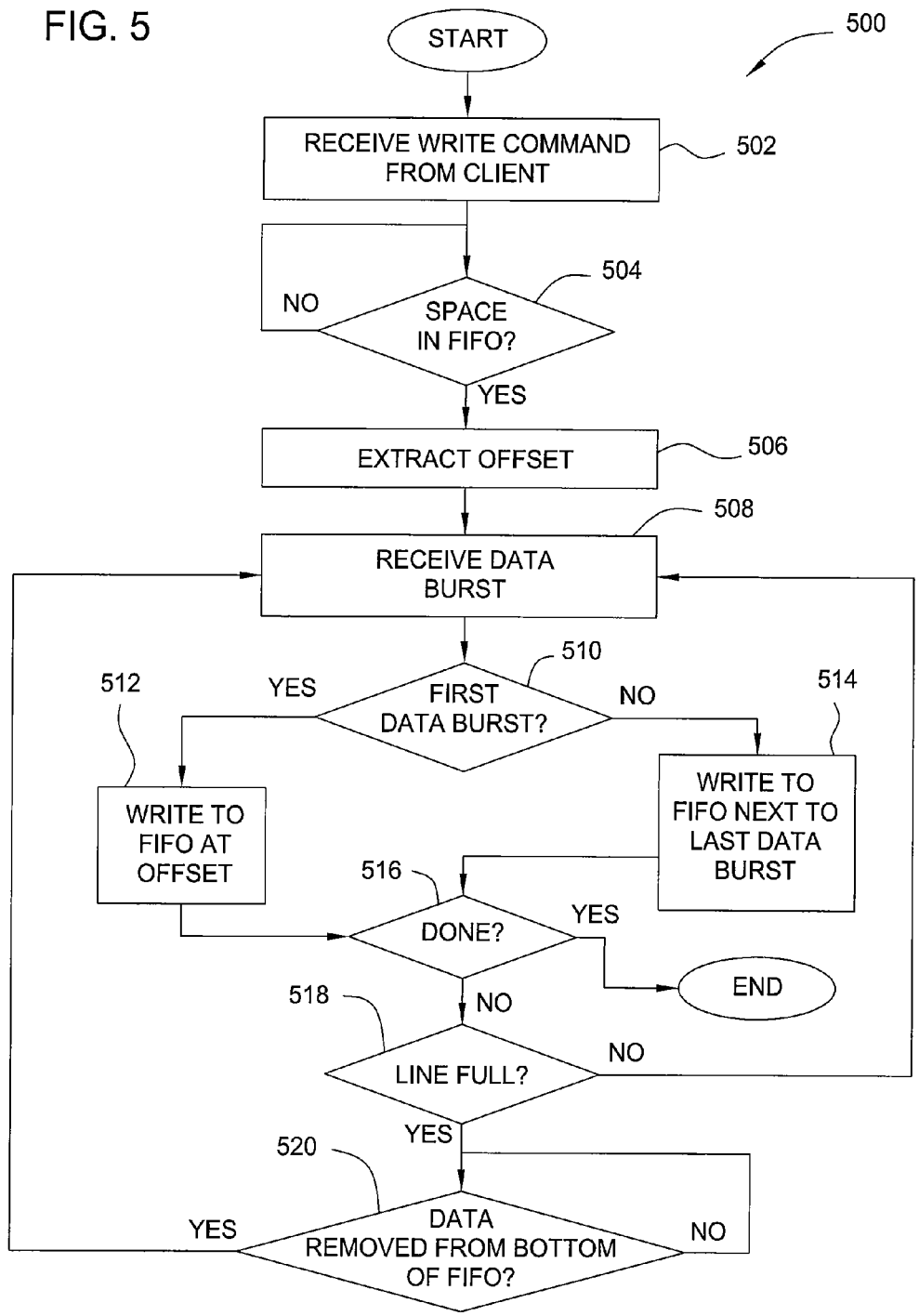
FIG. 5 is a flowchart of method steps for packing and aligning data, according to one embodiment of the invention.

FIG. 5 is a flowchart of method steps for packing and aligning data, according to one embodiment of the invention. The method 500 starts at step 502, where write data packer 304 receives a write command from client 301. At step 504, write data packer 304 waits until sufficient space exists in FIFO 308 to write data. Once sufficient space exists, write data packer 304 advances to step 506 where the offset is extracted from the write command. At step 508, write data packer 304 receives data burst 404 from client 301. At step 510, write data packer 304 determines whether received data burst 404 is the first data burst 404 received from client 301. If the received data is the first data burst 404 received from client 301, then the method 500 advances to step 512 where data burst 404 is written to FIFO 308 at the specified offset. If the received data is not the first data burst, then the method 500 advances to step 514 where data burst 404 is written immediately next to previously received data burst 404. The method 500 then advances to step 516.

At step 516, write data packer 304 determines whether client 301 is finished writing data bursts 404. If so, the method 500 terminates. If not, the method 500 advances to step 518 where write data packer 304 determines whether the current line in FIFO 308 is full. If the line is not full, the method 500 returns to step 508 and additional data bursts 404 may be received. If the line is full, the method 500 advances to step 520 where write data packer 304 waits until packed, aligned data 406 is removed from the bottom of FIFO 308. In one embodiment, write data packer 304 transmits a "ready" signal to iterator 314 so that data is removed from the bottom of FIFO 308. Once data is removed, additional lines of FIFO 308 may be written to and the method returns to step 508 where additional data bursts 404 may be received. The method 500 repeats steps 508-520 until all data has been received from client 301, at which point the method 500 terminates.

Figure 6:
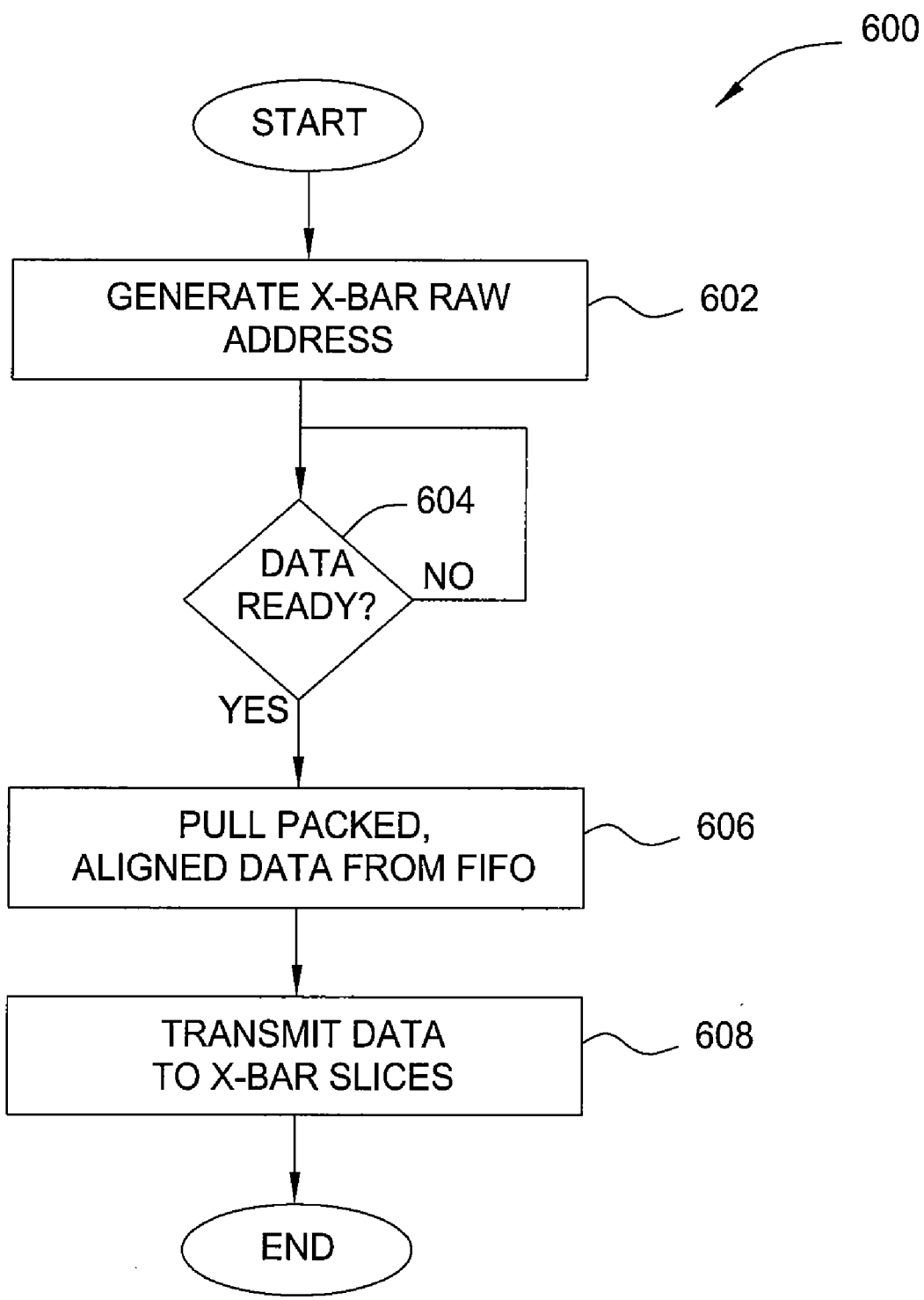
FIG. 6 is a flowchart of method steps for pulling data from a data packer, according to one embodiment of the invention.

FIG. 6 is a flowchart of method steps for pulling data from write data packer 304, according to one embodiment of the invention. The method 600 begins at step 602, where iterator 314 generates a crossbar raw address. At step 604, iterator 314 waits until data is ready to be extracted from FIFO 308. At step 606, iterator 314 pulls packed aligned data 406 from the bottom of FIFO 308, and at step 608 iterator 314 transmits this data to x-bar slice 306. The method 600 then terminates.

In sum, the write data packer packs and aligns data received from a client during the latency period introduced by a memory management unit (MMU). The depth of the write data packer is selected to ensure that the latency of the packing and alignment procedure is matched to the latency of the MMU. The packed and aligned data and the physical address thus become available simultaneously. The write data packer assigned to a given client packs data received from that client into segments sized to match the maximum PP memory bandwidth and writes the data at an offset matching the alignment expected by the PP memory. The packed and aligned data is stored in a FIFO until the physical address of the data becomes available.

Advantageously, the write data packer reduces the time required for a write cycle by parallelizing latency periods. The write data packer prevents clients with a low write burst size from under-utilizing the memory bandwidth by packing individual data bursts into a larger segment equal in width to the maximum PP memory bandwidth while simultaneously aligning the data. The packing and alignment procedure is implemented during page translation, thus avoiding additional delays. The write data packer also prevents clients from reserving the iterator until a completed burst has been packed and aligned. Thus, the iterator does not sit idle while waiting for write data to arrive.

While the foregoing is directed to embodiments of the present invention, other and further embodiments of the invention may be devised without departing from the basic scope thereof, and the scope thereof is determined by the claims that follow.

We claim:

1. A computer system comprising:
   a memory unit;

a plurality of clients that generate requests to write data into the memory unit, wherein each request includes an offset and a virtual page number associated with data specified by the request; and an input/output unit that receives the requests to write data from the clients and formats the data before the data is written into the memory unit, wherein the data is formatted substantially during the period when virtual page numbers included in the requests are translated into physical addresses, wherein the input/output unit includes a plurality of alignment buffers, each corresponding to one of the clients and each being configured to output data that has an offset that is the same as the offset specified in the request to write said data.

2. The computer system according to claim 1, further comprising a graphics processing unit, and wherein the input/output unit is a non-isochronous hub for the graphics processing unit.

3. The computer system according to claim 2, wherein the memory unit comprises a frame buffer for the graphics processing unit.

4. The computer system according to claim 1, wherein a request to write data received from a first client includes a series of data bursts having a size of M1 bytes and a request to write data received from a second client includes a series of data bursts having a size of M2 bytes, and the alignment buffers corresponding to the first client and the second client have a width of N bytes, where N>M1 and N>M2.

5. The computer system according to claim 4, wherein M1 is not equal to M2.

6. The computer system according to claim 4, wherein the alignment buffer corresponding to the first client has a depth of L1 lines (L1>1) and the write data associated with the write request received from the first client is stored in a contiguous manner and in multiple lines of the alignment buffer corresponding to the first client, and the alignment buffer corresponding to the second client has a depth of L2 lines (L2>1) and the write data associated with the write request corresponding to the second client is stored in a contiguous manner and in multiple lines of the alignment buffer corresponding to the second client.

7. The computer system according to claim 1, wherein all of the alignment buffers are FIFOs having the same width.

8. The computer system according to claim 1, wherein the input/output unit further includes an offset logic unit for determining an offset of write data included in a write request from a client and storing the write data in a corresponding alignment buffer with the offset.

9. The computer system according to claim 1, wherein the input/output unit further includes a plurality of iterators corresponding to the plurality of alignment buffers, each iterator configured to read out write data from a corresponding one of the alignment buffers.

10. The computer system according to claim 9, further comprising a memory management unit configured to translate a virtual address into a physical address within the memory unit and transmit the physical address to an arbiter coupled to the plurality of iterators.

11. A graphics processing unit configured to store write data in a memory unit from a plurality of clients that generate requests to write data into the memory unit, wherein each request includes an offset and a virtual page number associated with data specified by the request, the graphics processing unit comprising:

a memory interface coupled to the memory unit; and an input/output unit that receives the requests to write data from the clients and formats the data before the data is written into the memory unit, wherein the data is formatted substantially during the period when virtual page numbers included in the requests are translated into physical addresses, wherein the input/output unit includes a plurality of alignment buffers, each corresponding to one of the clients and each being configured to output data that has an offset that is the same as the offset specified in the request to write said data.

12. The graphics processing unit of claim 11, wherein the input/output unit is a non-isochronous hub for the graphics processing unit.

13. The graphics processing unit of claim 12, wherein the memory unit comprises a frame buffer for the graphics processing unit.

14. The graphics processing unit of claim 11, wherein a request to write data received from a first client includes a series of data bursts having a size of M1 bytes and a request to write data received from a second client includes a series of data bursts having a size of M2 bytes, and the alignment buffers corresponding to the first client and the second client have a width of N bytes, where N>M1 and N>M2.

15. The graphics processing unit of claim 14, wherein M1 is not equal to M2.

16. The graphics processing unit of claim 14, wherein the alignment buffer corresponding to the first client has a depth of L1 lines (L1>1) and the write data associated with the write request received from the first client is stored in a contiguous manner and in multiple lines of the alignment buffer corresponding to the first client, and the alignment buffer corresponding to the second client has a depth of L2 lines (L2>1) and the write data associated with the write request corresponding to the second client is stored in a contiguous manner and in multiple lines of the alignment buffer corresponding to the second client.

17. The graphics processing unit of claim 11, wherein all of the alignment buffers are FIFOs having the same width.

18. The graphics processing unit of claim 11, wherein the input/output unit further includes an offset logic unit for determining an offset of write data included in a write request from a client and storing the write data in a corresponding alignment buffer with the offset.

19. The graphics processing unit of claim 11, wherein the input/output unit further includes a plurality of iterators corresponding to the plurality of alignment buffers, each iterator configured to read out write data from a corresponding one of the alignment buffers.

20. The graphics processing unit of claim 19, further comprising a memory management unit configured to translate a virtual address into a physical address within the memory unit and transmit the physical address to an arbiter coupled to the plurality of iterators.

* * * * *